Sept. 2, 1941. R. L. COOPER ET AL 2,254,774
HIGHWAY CROSSING SIGNAL
Filed May 20, 1939 4 Sheets-Sheet 1
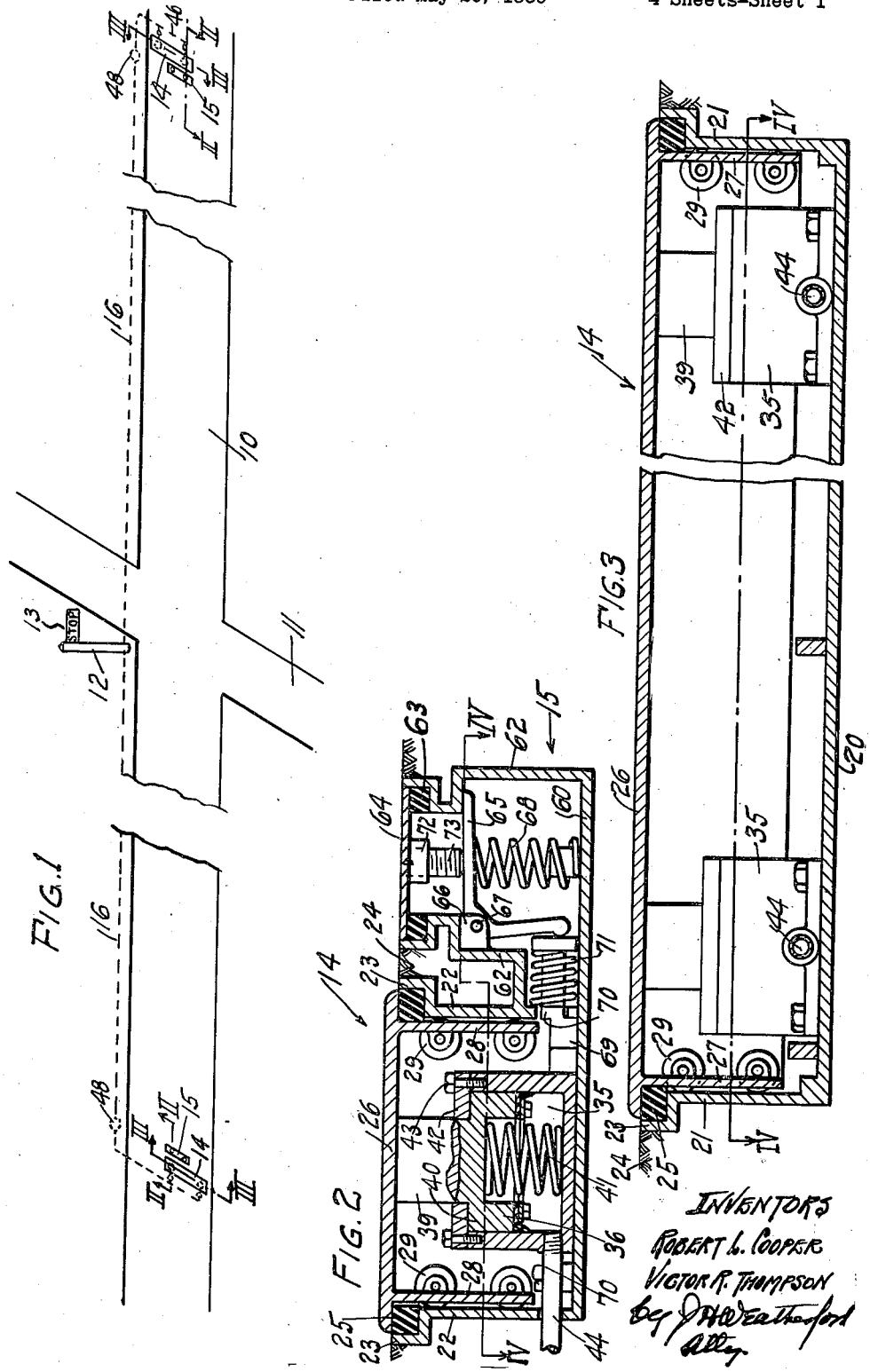
INVENTORS
Robert L. Cooper
Victor R. Thompson
by J H Weatherford
Atty

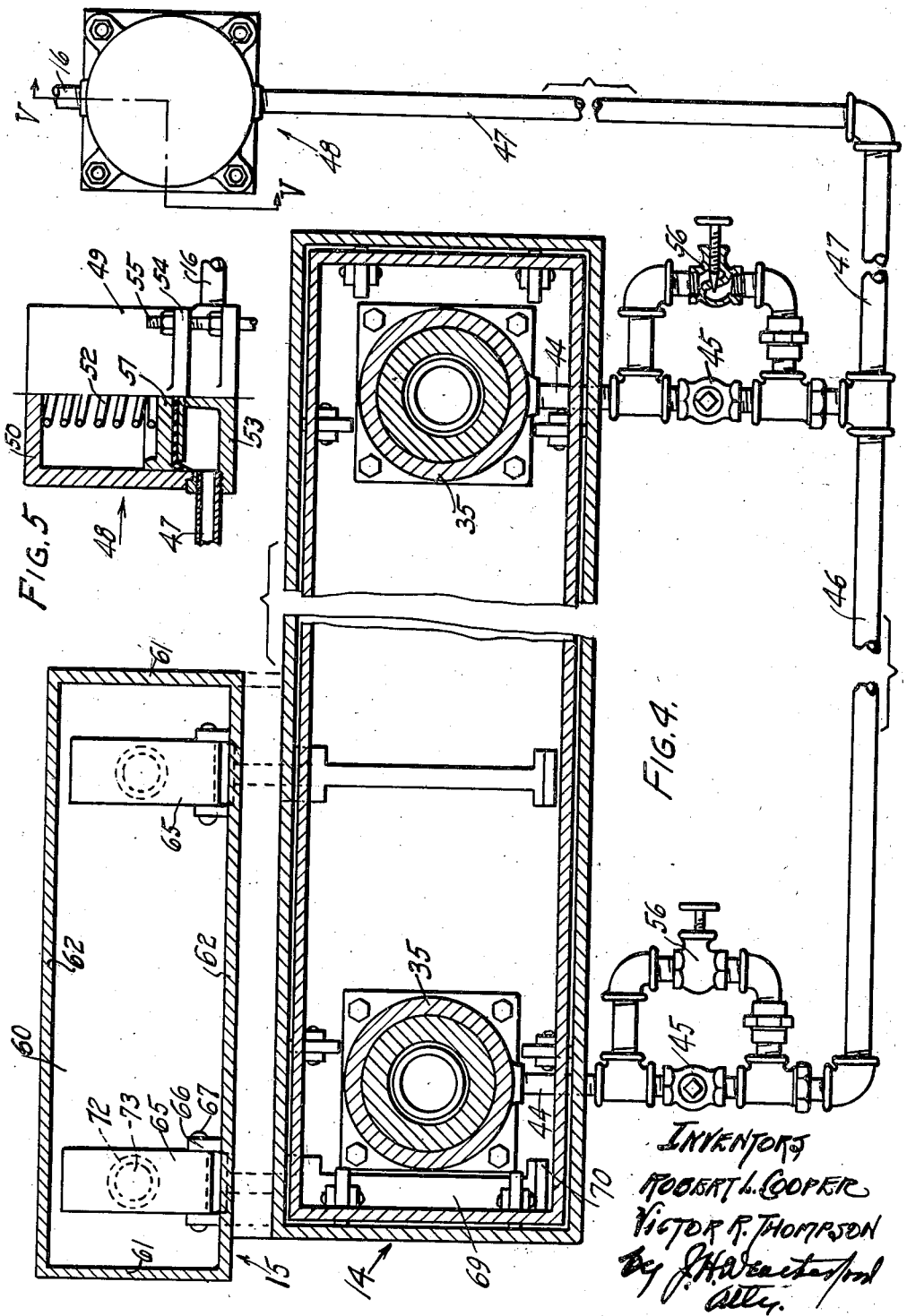

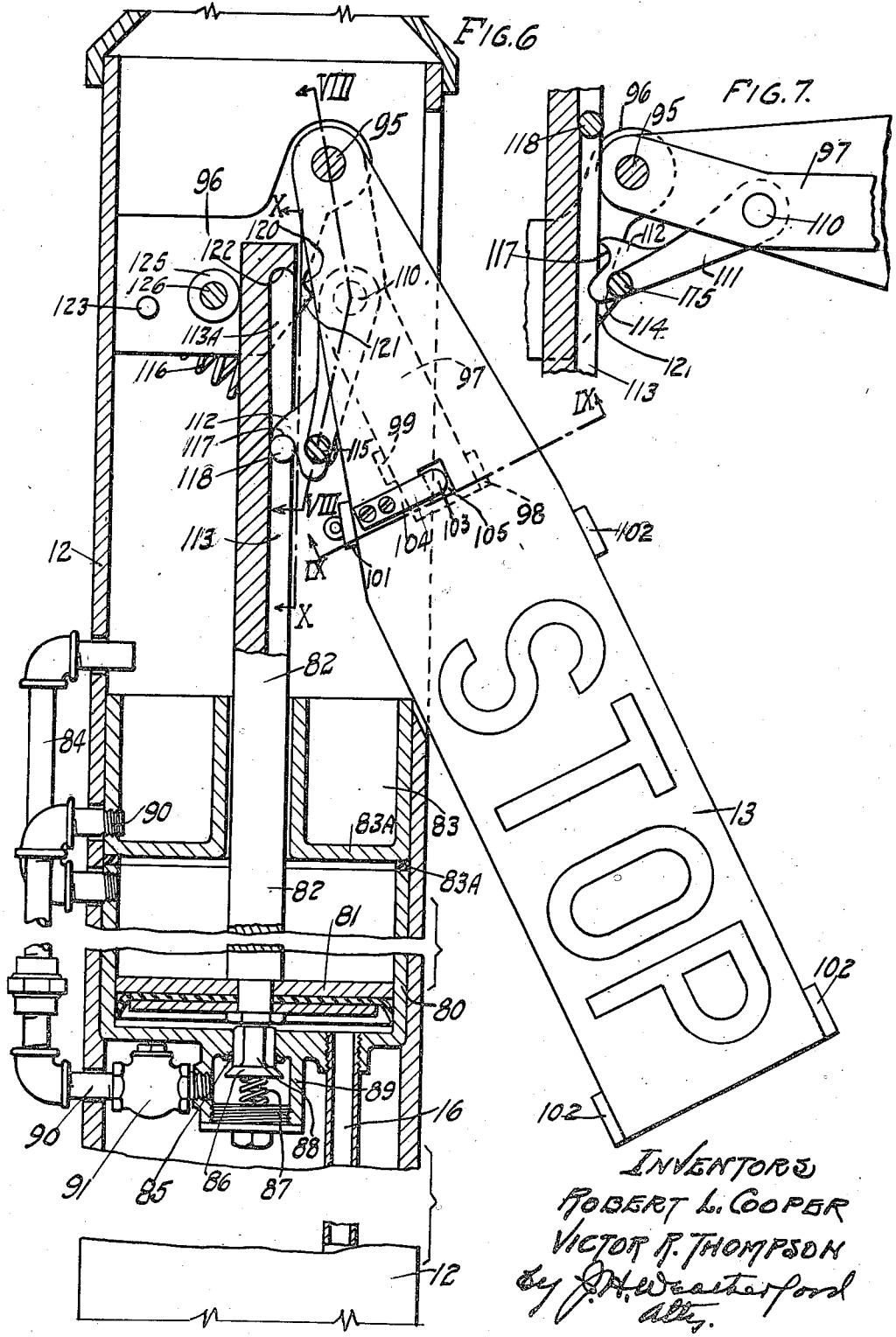

Sept. 2, 1941.  R. L. COOPER ET AL  2,254,774
HIGHWAY CROSSING SIGNAL
Filed May 20, 1939  4 Sheets-Sheet 4
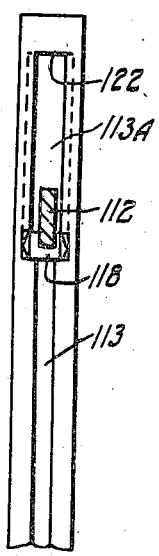
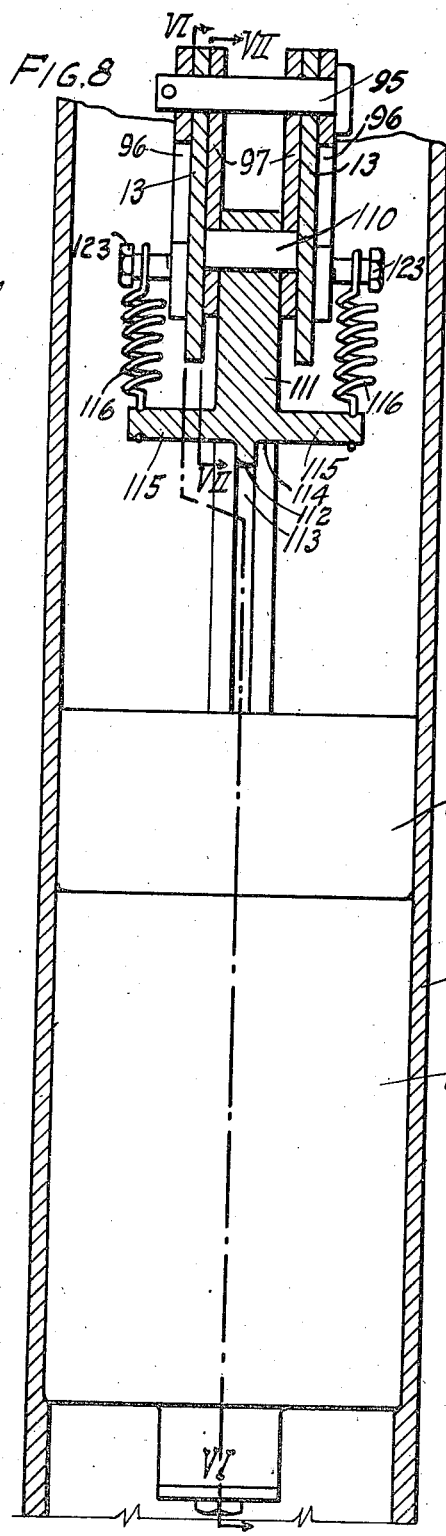
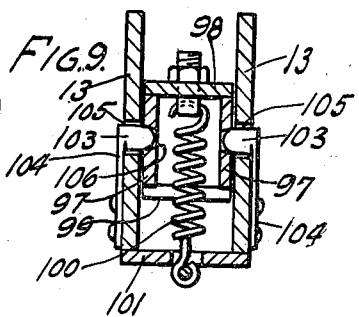
INVENTORS
ROBERT L. COOPER
VICTOR K. THOMPSON
by J. H. Weatherford
Atty.

Patented Sept. 2, 1941

2,254,774

UNITED STATES PATENT OFFICE 2,254,774

HIGHWAY CROSSING SIGNAL

Robert L. Cooper, Arlington, Tenn., and Victor Reed Thompson, Olive Branch, Miss.

Application May 20, 1939, Serial No. 274,728

10 Claims. (Cl. 116—63)

This invention relates to crossing signals, and has particular relation to signals for indicating to drivers of vehicles which are nearing a highway on a cross road, that a vehicle on the highway is approaching the intersecting cross road, or that a train is similarly approaching the cross road.

It particularly relates to a device of this kind in which approaching vehicles, through hydraulic means, operate a semaphore or arm at the intersecting road and in which this operation is controlled from a point at such distance from the cross road that vehicles already having started across the highway or track will have time to clear before the signal-giving vehicle reaches the road intersection, and in which the signal is maintained for a predetermined period and then cancelled in order that the signal-giving vehicle, after having entered the block may itself clear the road crossing before the signal is discontinued.

Devices of this kind embodying some of these features have heretofore been known, but there are many problems in connection therewith which are far from having been solved. In the case of trains, each individual car truck in succession ordinarily operates the signal device. In the case of automobile travel on highways each automobile similarly will operate the signal; and in both cases, but particularly on highways where the operating mechanism must be substantially flush with the road surface, freezing up of the apparatus is a very present source of trouble. In highway work also provision must not only be made that approaching vehicles operate the signal but also that receding vehicles do not operate the device, it being unfortunately impossible in highway travel to insure that vehicles will stay on their own side of the road.

Since the problems to be met in highway operation are inclusive of those to be met in rail operation the present drawings and description are confined to highway operation, it being however understood that it is intended that the term "vehicle" shall include railway engines and cars and that the term "roadway," where the context will allow, will include the rails and other appurtenances of a railroad track.

The objects of the present invention are:

To provide a signal device which is responsive to the actuation by the passage of a single vehicle, and which after so responding will remain in indicating position for a predetermined length of time.

To provide a signalling device which, after response to an initial actuation, will not further respond to additional actuation, but in which such additional actuation will successively be effective to extend the release period to such predetermined length after the actuation by the last vehicle of such series.

To provide means for preventing or at least minimizing the effect of freezing on the actuating device.

To provide means for preventing operation of the actuation device by vehicles moving away from the intersecting highway.

The means by which the foregoing and other objects are accomplished and the manner of their accomplishment will readily be understood from the following specification on reference to the accompanying drawings, in which:

Fig. 1 is a diagrammatic view of a highway with an intersecting road; showing a semaphore signal in operation at such intersecting road and the positions of the actuating mechanisms in relation to the highway in which they are placed.

Fig. 2 is a sectional elevation of the actuating mechanism taken on either of the lines II—II of Fig. 1.

Fig. 3 is a sectional elevation taken on either of the lines III—III of Fig. 1.

Fig. 4 is a sectional plan taken on the line IV—IV of Figs. 2 and 3.

Fig. 5 is a sectional elevation taken on the line V—V of Fig. 4.

Fig. 6 is a sectional elevation of the upper portion of the semaphore post and the operating cylinder assembly taken on the center line; and of the arm moved thereby, taken on the line VI—VI of Fig. 8.

Fig. 7 is a fragmentary sectional elevation on the line VII—VII of Fig. 8, showing the latch locking the semaphore in signalling position.

Fig. 8 is a sectional elevation taken on the line VIII—VIII of Fig. 6.

Fig. 9 is a section taken on the line IX—IX of Fig. 6; and

Fig. 10 a fragmentary sectional elevation taken on the line X—X of Fig. 6.

Referring now to the drawings in which the various parts are indicated by numerals:

10 is a main highway which is intersected by a cross road 11 on which minor travel occurs and on which travel must give way to that on the main highway. 12 is a post carrying a semaphore 13, here shown as moved to stop position. 14 are actuating mechanisms disposed in the highway at substantially equal distances from the cross roads, these mechanisms being of substantial identity, and being disposed with their length transverse to the highway, each extending slightly more than halfway across the highway in the direct path of vehicles approaching the cross roads.

15 are associated locking mechanisms which prevent the operation of the actuating mechanisms by vehicles which have passed the cross highway and are not properly following the right hand side of the highway which they should occupy. 16 are pipe lines which connect the operating mechanisms 14 with the mechanism carried by the semaphore post 12. Each of the operating mechanisms 14 essentially includes a rectangular casing having a bottom 20, ends 21, and sides 22. At the top the ends 21 and the sides 22 are outwardly flanged and thence have an upwardly continuing portion 23, the top of which is set flush with the surface of the pavement 24. These outwardly and upwardly extending portions of the casing form a protected shoulder extending peripherally around the casing, which shoulder carries a co-extensive cushion 25 substantially rectangular in cross section and of soft rubber.

26 is a rectangular top for the casing. This cover rests on and is depressably supported by the cushions 25, the top being of such length and width that it will lie entirely within the surrounding, upstanding edge 23 of the casing, and under no circumstances be supported thereby. Extending downward from the top 26 are ends 27 and sides 28 which are preferably generously spaced inward from the ends 21 and sides 22 respectively to leave a clear passageway for water that may enter the casing. Both the end and side portions thus downwardly extending are provided with suitably journalled rollers or wheels 29 which project through the said end and side portions into positioning and guiding contact with the end and side walls 21 and 22 of the casing.

The underside of the top 26 is preferably sealed to the cushions 25 on which the top rests and the undeside of these cushions are likewise sealed to the surrounding end walls and to the shoulders on which the cushion rests. The cushion itself is preferably a continuous gasket and if not so continuous, is made as nearly water-tight at the corners of the casing as is possible, the purpose and intent of the construction thus described being to prevent, as far as possible, entrance of water into the casing. Should water enter, however, the generous space provided between the downwardly projecting ends and sides 27 and 28 of the top and the side walls of the casing gives ample chance for the water to pass down without freezing the moving parts to the casing walls. The wheels 29 offer relatively very small areas which even though they should freeze, are readily broken loose by the impact of the vehicle passing over the top of the casing.

Disposed within each of the casings 14 are a pair of cylinders 35, these cylinders being positioned respectively adjacent the opposite ends of the casing. Disposed within the cylinders are plungers 36, the upper portion 39 of these plungers being of reduced diameter to form shoulders 40, these upper portions extending upward to solidy underlie the casing top 26. The plungers 36 are resiliently supported by springs 41. 42 are annular rings which surround the reduced portion 39 of the plungers, these rings being held down by bolts or cap screws 43 to limit the upward movement of the plungers under the action of the springs 41, and to thereby establish the capacity of the cylinders.

44 are discharge pipes which lead from these cylinders to connections with the pipe lines 16. These discharge pipes 44, most clearly seen in Fig. 4, lead through check valves 45 and pipes 46 and 47, the pipe 47 being a joint pipe for both cylinders, to a shock absorber 48 and through this absorber to the pipe line 16 which extends along the highway to the signal post 12. The shock absorber 48 preferably comprises an upright cylinder 49 having a closed top 50 in which cylinder there is mounted a plunger or piston 51 which is held down by a compression spring 52. The cylinder has a base 53 which is secured to the barrel portion thereof as by lugs 54 and bolts 55, which base forms a bottom head for the cylinder. The pipes 47 and 16 are connected into opposite sides of the cylinder below the piston 51 and above the base 53, any sudden influx of liquid into the absorber through the pipe 47 displacing the piston, and the flow of this liquid from the absorber being subsequently accomplished by the pressure of the spring 52.

The pipes 44 are by-passed around the check valves 45, and needle valves 56 are provided in these by-passes, these needle valves being adjustable to regulate flow therethrough and being introduced for the purpose of allowing slow return flow through the pipes 16 from the signal mechanism, as will be hereinafter described.

The locking mechanism 15, associated with the actuating mechanism 14, comprises an adjacent rectangular housing essentially similar to the casing of the operating mechanism but ordinarily much smaller, this housing having a bottom 60, end walls 61, and side walls 62, which end and side walls are outwardly stepped, as in the previous instance, to carry rectangular cushion strips 63 of soft rubber, which strips depressably support a plate 64 forming the top of the housing. Disposed within the housing, adjacent its opposite ends, are bell crank levers 65, having each a substantially horizontal and a substantially vertical leg, the horizontal leg being uppermost. The bell crank levers are hingedly carried by brackets 66 and hinge pins 67, the brackets being integral with one of the side walls 62 of the housing. 68 are compression springs which underlie and support the horizontal legs of the bell crank lever 65. The vertical legs of the bell crank levers contact horizontally shiftable members 69, which members have upstanding stop portions 70 adapted to be shifted beneath the sides 28, which depend from the casing top 26, and which members, when so shifted, prevent the depression of these sides and through them of the casing top. 71 is a compression spring adapted to return the member 69 into initial position. 72 are bosses on the underside of the plate 64, and 73 adjustable studs extending therefrom into contact with the horizontal legs of the bell crank levers 65.

It will be noted that the plate 64 is substantially flush with the top of the housing and of the road surface whereas the top 26 of the casing is thereabove and above the road surface, so that a wheel having depressed the plate 64 contacts and depresses the top 26 before its weight is removed from the plate.

With particular reference to Figs. 6 to 10 inclusive, the semaphore post 12 supports a cylinder 80 into the bottom of which the pipes 16 enter. Mounted in the cylinder is a piston 81 having an upwardly extending piston rod 82 which preferably is square so that it can not turn. Disposed above the cylinder 80 is an overflow tank 83, which is made annular in order that the piston rod 82 may extend upward therethrough. This tank is sealed to the top of the cylinder as by a gasket 83—A. The upper end of the cylinder is provided with an overflow pipe 84 which extends upwardly above the top of the tank 83 and discharges thereinto.

The base of the cylinder is apertured and provided with a valve seat 85. 86 is a mushroom valve which is normally held seated against the seat 85 by a compression spring 87. The valve 86 has a stem 88 which extends above the bottom of the cylinder when the valve is held seated by the spring 87, this stem being adapted to be contacted by the piston on its descent and to force the valve open.

89 is a chamber enclosing the valve 86 and spring 87. 90 is a pipe leading from the tank 83 through a check valve 91 into the chamber 89, this connection insuring, through the open valve 86, that any deficiency of operating liquid beneath the piston 81 in the cylinder 80 will be replenished at the completion of each operation of the semaphore.

The semaphore 13 preferably comprises two spaced plates, both of which are designated by the numeral 13 in Figs. 8 and 9, and which are oscillatably mounted on a pin 95. The pin 95 is supported by a pair of brackets 96 which are suitably carried by the upper end of the semaphore post 12. Disposed between the two plates 13, are a pair of spaced arms 97 which are likewise pivotally mounted on the pin 95. At their outer ends the arms 97 are secured as by welding to connecting cross bars 98 and 99, the bar 98 serving as a support for the upper end of a tension spring 100.

The spaced plates 13 of the semaphore arm are also connected by transverse bars 101, 102, which bars are secured thereto as by welding. The bar 101 is positioned to underlie the bar 98, and the lower end of the spring 100 secured thereto. 103 are detents carried as by spring arms 104 secured to the plates 13. These detents project through openings 105 in the plates 13 and are adapted to engage depressions 106 in the arms 97 when the semaphore plates respond to the pull of the spring 100.

The arms 97 carry a second pin 110 on which is pivotally mounted a latch 111. The latch 111 has an extending tongue 112 which is relatively of reduced thickness and adapted to slide in a complementary slot 113 in the piston rod 82. The latch has rounded end portions 114 on the laterally opposite sides of the tongue 112, and has studs 115 which further laterally extend the rounded end portions. Adjacent their outer ends these studs are annularly grooved to receive the ends of tension springs 116, hereinafter described.

The tongue 112 projects longitudinally beyond the rounded ends of the latch, and laterally from such end is additionally provided with an arcuate seat 117 which is adapted for engagement by a ball or roller 118. The restricted width of the slot 113 terminates well short of the end of the piston rod (Fig. 10) and thereabove is continued as an enlarged slot or race 113—A, in which the roller 118 is confined but free to move along the rod, the junction of the enlarged and smaller slot portions forming a seat for the roller.

The brackets 96 are provided with arcuate seats 120 which are adapted to be engaged by the outwardly extending studs 115 when the semaphore is in raised position, these studs, in Fig. 7, being shown in such engagement, and these brackets are provided with inclined approach portions 121 leading to the arcuate seat portions 120. The roller race 113A terminates short of the end of the piston rod 82 in an abutment 122 which limits the movement of the roller in the race.

The tension springs 116 extend from the studs 115 along the sides of the brackets 96 and are secured at their opposite ends to such brackets as by anchor members 123, these springs resiliently holding the tongue 112 in the piston slot 113 and the studs 115 against the inclined approach portions 121 of the brackets as the latch 111 is moved upward and the studs in engagement with the seats 120 of the brackets as latch movement is completed.

125 is a roller journalled on a pin 126, which roller supports the piston 82 against lateral thrust during operation.

The discharge capacity each of the cylinders 35 is sufficient to raise the piston 81 just far enough to raise the semaphore arm 13 to substantially horizontal position. The capacity of each of the shock absorbers 48 is at least double the discharge capacity of each cylinder 35. The capacity of the operating cylinder 80 is substantially equal to all four of the cylinders 35, but only the first part of the stroke of the piston 81 in the cylinder 80 is effective to raise the semaphore arm. Beyond this amount of raise the mechanisms interconnecting the piston rod 82 and the semaphore arm, namely, the roller 118 and the tongue 112 engaging therewith, disengage and permit the further raise of the piston rod without action on the arm.

During operation piston leakage from time to time will probably occur past the piston. Should such leakage reach an excessive amount it would be forced on full travel of the piston either upward along the piston rod and caused to overflow into the tank 83 or through the pipe 84 and similarly overflow into this tank. When the piston descends, as return flow occurs through the pipe 16, it contacts at the lower end of its stroke with the stem 88 of the valve 86 and opens this valve allowing return flow from the tank 83 through the pipe 90 and check valve 91 into the chamber 89 and into the cylinder 80 to supply any deficiency which might otherwise occur and thereby permits the charge in each of the operating cylinders 35 to be restored to normal.

The weight of the piston is insufficient to open the valve 86 if that valve is properly tensioned to insure actuation of the piston at all times, but as a condition precedent to the return of the piston to the bottom of the stroke the roller 118 must re-engage with the end of the latch 111, and having so re-engaged and tripped the latch the weight of the semaphore arm acting through the toggle linkage would supply sufficient force to cause this opening.

Preparatory to use the semaphore post 12 is installed adjacent the intersecting highway in such position that when raised, the semaphore 13 will be visible from both directions on the intersecting road.

The operating mechanisms 14 and related locking mechanisms 15 are installed in the highway several hundred feet away from the intersecting road, the operating mechanisms being positioned to lie across the right hand lanes of travel of vehicles approaching the intersecting road from both directions. The locking mechanisms 15 are in each case disposed between the actuating mechanisms and the intersecting road in such position that vehicles moving away from the intersecting road will strike them provided they would also strike and operate the actuating mechanism. The casing of the actuating mechanism is set substantially flush with the surface of the highway, the construction of the mechanism preferably being such that the top 26 will project a minor amount above such surface. Similarly the housing of the locking mechanism 15 is set substantially flush with the pavement surface, but in this case the top plate is preferably also level with the top of the paving surface and thereby slightly below the top of the operating mechanism. Connection is made from the two operating mechanisms through the expansion chambers 48 and the pipe lines 16 to the semaphore mechanism.

After installation the actuating cylinders and pipe line are completely filled with a liquid, preferably oil, and the overflow tank is also filled with the same liquid.

In use, when a vehicle approaches the intersecting road, unless it be so far to the left of the center of the road as to be entirely on the left hand side, its wheels will strike the top 26 of the operating mechanism in its path and depress this top. If the vehicle be in its proper path all of the wheels will strike this top, but even though it be so far to the left that only the wheels on one side strike the top, action will occur. The wheels striking the top plate depress either one or both of the plungers 36 forcing the liquid from one or both of the cylinders into the shock absorber from which absorber it is forced, by the action of the spring 52, through the related pipe line 16 to the cylinder 80 of the semaphore operating mechanism. The liquid entering the cylinder 80 forces the piston 81 and the piston rod 82 upward to effect semaphore operation. As the piston rod 82 is moved the roller 118 is likewise carried upward. The roller (Fig. 6) being in engagement with the arcuate seat 117 of the latch tongue 112 forces the end of the latch directly upward, the end of the latch being held against lateral displacement by the springs 116. This upward movement of the latch forces the pin 110 outward and upward, swinging the arms 97 outward and upward about the pin 95. Should this movement prove too rapid for the semaphore arms 13 to instantly respond, the detents 103 are disengaged and the movement of the arms 97 completed by extending the spring 100, the subsequent retraction of this spring causing the semaphore to complete its movement and permitting re-engagement of the detents. The upward movement of the piston rod 82 and the roller 118 continue with the roller in engagement with the arcuate seat 117 until the semaphore arms 13 are fully extended, as shown in Fig. 7, after which the roller may disengage from the arcuate seat and may continue its upward movement without effect on the semaphore, the studs 115 at such time engaging the seats 120 of the brackets 96 and holding the arms in extended and warning position. Should one only of the cylinders 35 of the actuating mechanism be operated the displacement of that cylinder is sufficient to accomplish the full raising of the semaphore to horizontal position. Should both cylinders act at the same time and a surplus charge of actuating liquid be delivered the effect would be to continue the movement of the roller 118 without effect on the semaphore.

The liquid discharged from any actuating cylinder 35 flows in major part through the check valve 45 related to such cylinder and return flow through this check valve is prevented. A minor part of the flow may also occur through the needle valve 56 through which return flow must occur. As soon as the actuating vehicle passes, the spring 41 of the cylinder tends to raise the plunger 36 of such cylinder and to cause the liquid in the pipe lines to refill the cylinder. This return flow to the cylinder is prevented by the check valve 45, but regulated flow does occur through the needle valve 56. As soon as the impulse of the liquid on the operating piston 81 at the semaphore ceases, descent of this piston begins. This flow must occur through the needle valve 56 to the cylinder from which the impulse was given and the opening of this needle valve is so regulated as to permit the piston to descend in a predetermined length of time, which length of time is that time which should elapse after the vehicle passes, before the semaphore arm is released and the signal discontinued.

Assuming that only one of the actuating cylinders 35 is operated, the operating piston 81 raises the roller 118 only the amount necessary to fully extend the semaphore arm. As this raise is completed the roller still rests on the shoulder formed between the slot 113 and the raceway 113—A, but the longtitudinally extending end of the tongue 112 has moved into the slot beneath the roller. As the liquid flows back through the pipe 16 and the needle valve 56 to the actuating cylinder 35 the piston 81 and piston rod 82 slowly descend, leaving the roller 118 supported by the tongue 112. As the down stroke of the piston is completed the abutment 122 at the end of the piston rod strikes the roller and causes it, by cam action, on the tongue 112, to disengage the latch studs 115 from the bracket seats 120, permitting the semaphore arms to drop and move the roller downward to its seat at the lower end of the roller race.

Where both of the cylinders 35 of an actuating mechanism 14 have been depressed, the piston 81 obviously would move upward twice the amount that it would move under the displacement of one cylinder. This action would first extend the semaphore arm, as above described, to horizontal position, and thereafter the rod would carry the roller with it in its upward movement but without effect on the semaphore. Return flow in such event would be through two needle valves 56 to the two related cylinders and would take place in an identical interval of time as through one needle valve to one actuating cylinder; and this would also be similarly true were all four actuating cylinders moved at the same time, as by vehicles from two directions, causing the two actions simultaneously.

Ordinarily, a succession of vehicles at spaced intervals, hardly ever equal, strike the operating mechanisms. In instances of this kind it is obvious that partial return flow only has occurred to the actuating cylinders and that the later action could only raise the piston rod 82 the amount that it had dropped. Such action would therefore insure that the pistons would descend and release the semaphore arm at the proper time after such last vehicle had passed.

Should a vehicle which has passed the intersecting road be so far out of its proper lane as to pass over the actuating mechanism it must first strike the plate 64 of the locking mechanism and depress that plate. This action through the bell crank lever 65 would shift the stop portion 70 beneath the sides 28 depending from the top 26 of the actuating mechanism so that this top might not be depressed. This action would occur prior to the wheels striking the top 26, but these parts are so closely associated that a resilient tire, such as the present day tires of motor vehicles, would still be holding the plate 64 down when it acted on the top 26 of the actuating mechanism and this top being held against depression by the stop 70, action would be prevented. As the weight of the wheels shifts completely from the locking mechanism to the actuating mechanism it is intended that the weight on the actuating mechanism will be sufficient to prevent the dislodgement of the stops from therebeneath until the wheel leaves the actuating mechanism and that therefore no action can occur.

I claim:

1. The combination with a semaphore arm, a semaphore post, means pivotally securing said arm to said post, an actuating cylinder and piston assembly carried by said post, means for delivering actuating flows of liquid to said cylinder, means for regulating return flow therefrom, and means for operably coupling said piston to said arm, said coupling means comprising a piston rod connected to and extending from said piston into adjacency with said arm, said rod having therealong adjacent its end an elongated raceway which is closed adjacent said end, and having a slot of less width than said raceway extending therefrom toward said piston, a roller disposed in said raceway and constrained for movement therealong between said slot and said raceway closure, a toggle comprising a portion of said arm and a latch having one end pivotally engaged to said arm, said latch having its opposite end extending into adjacency with said post, and having a tongue portion adapted to slide in said slot and an adjacent seat portion adapted to contact said roller, resilient means urging said tongue and seat respectively into slot and roller engagement, means carried by said post notched for engagement with the end of said latch, said toggle parts being so proportioned and disposed that upward movement of said roller moves said latch end seated thereon upward, into detaining engagement with said notch, said tongue into position underlying said roller, and said arm into indicating position, and concurrently said seat is disengaged from roller.

2. The combination with a semaphore arm, biased to non-indicating position, a semaphore post, means pivotally securing said arm to said post, an actuating cylinder and piston assembly carried by said post, means for delivering actuating flows of liquid to said cylinder, means for regulating return flow therefrom, and means for operably coupling said piston to said arm, said coupling means comprising a piston rod connected to and extending from said piston into adjacency with said arm, said rod having therealong adjacent its end an elongated raceway which is closed adjacent said end, and having a slot of less width than said raceway extending therefrom toward said piston, a member disposed in said raceway and constrained for movement therealong between said slot and said raceway closure, a toggle comprising a portion of said arm and a latch having one end pivotally engaged to said arm, said latch having its opposite end extending into adjacency with said post, and having a tongue portion adapted to slide in said slot and an adjacent seat portion adapted to contact said member, resilient means urging said tongue and seat respectively into slot and member engagement, means carried by said post notched for engagement with the end of said latch, said toggle parts being so proportioned and disposed that upward movement of said member moves said latch end seated thereon upward, into detaining engagement with said notch, said tongue into position underlying said member, and said arm into indicating position, and concurrently said seat is disengaged from said member, and said piston rod and piston are freed for progressively further movement under said actuating flows.

3. In a warning signal, a semaphore arm, having a non-indicating initial position, and an indicating position and being urged by gravity to return to initial position, means pivotally supporting said arm, an operating cylinder and piston, means connecting said piston and arm, and adapted to move said arm to indicating position on actuation of said operating piston, means for detaining said arm in indicating position, means for disengaging said connecting means as said arm reaches indicating position, means actuated by return of said piston to initial position to release said detaining means and permit return of said arm to initial position, an actuating mechanism including a pair of actuating cylinders and piston assemblies disposed in the line of travel of vehicles approaching said semaphore, each said assembly being adapted on passage of a said vehicle to discharge from its said cylinder a predetermined charge of liquid, a tube leading from each said actuating cylinder and a pipe line jointly connecting both said tubes and said operating cylinder, said pipe line including a shock absorbing chamber, check valves each respectively in a said tube and preventing return flow to a said actuating cylinder, and means each respectively by-passing a said check valve, said by-passing means including means for greatly restricting the rate of return flow relatively to the rate of discharge flow, said operating cylinder having a capacity at least equal to both said actuating cylinders, and each of said actuating cylinders a discharge flow adapted through said operating cylinder to move said arm to indicating position.

4. A highway warning signal and remote mechanism for operating said signal, said mechanism including a first depressible member in said highway in the line of travel of vehicles approaching said signal, and adapted for operation of said signal, a second depressible member in said highway adjacent said first member and between said first member and said signal, and means actuated by the passage of a vehicle, moving away from said signal, over said second member for supporting said first member against operating movement during the subsequent passage of said vehicle thereover.

5. A device in accordance with claim 4 in which said actuated means includes a bell crank lever, and a member slidable thereby into position underlying and supporting said first member.

6. A device in accordance with claim 4 in which said actuating means includes a member movable into a position beneath said depressable member.

7. A highway warning signal and remote mechanism for operating said signal, said mechanism including a first means in said highway in the line of travel of vehicles approaching said signal, and adapted for operation by passage of said vehicles, a second means in said highway adjacent said first means and between said first means and said signal, and means actuated by the passage of a vehicle moving away from said signal, over said second means, for supporting said first means against operating movement during the subsequent passage of said vehicle thereover.

8. In a warning signal, a semaphore arm, having a non-indicating initial position, and an indicating position and being biased to return to initial position, means pivotally supporting said arm, a cylinder, a piston in said cylinder biased to return to initial position, means carried by said piston, and means carried by said arm adapted for engagement with said piston carried means to move said arm toward indicating position on actuation of said piston, means, forming part of one of said means, for effecting disengagement of said piston carried, and arm carried, means as said arm reaches indicating position, to permit piston overtravel, means for detaining said arm in indicating position, means actuated by said piston carried means as said piston approaches initial position on return movement, for releasing said detaining means and permitting return of said arm to initial position; means for originating and transmitting an actuating flow of liquid to said cylinder, and means for regulating return flow of said liquid from said cylinder.

9. In a warning signal, a semaphore arm, having a non-indicating initial position, and an indicating position and being biased to return to initial piston, means pivotally supporting said arm, a cylinder, a piston in said cylinder, biased to return to initial position, means detachably connecting said piston and arm and adapted to move said arm to indicating position on actuation of said piston, means for detaining said arm in indicating position, means disconnecting said piston from said arm as said arm reaches indicating position, means actuated by said piston as it approaches initial position on return movement, for releasing said detaining means and permitting return of said arm to initial position; means for originating and transmitting an actuating flow of liquid to said cylinder, and means for regulating return flow of said liquid from said cylinder.

10. In a hydraulic semaphore for highways, means for creating flow of liquid to said semaphore, including an elongated casing disposed transversely across the line of travel of vehicles approaching said semaphore, a pair of actuating cylinder-and-piston assemblies disposed in said casing, respectively adjacent the opposite ends thereof, said casing including a depressible cover supported on said pistons and adapted on passage of a said vehicle to depress at least one said piston and discharge from its related said cylinder an actuating charge of liquid, tubular means establishing operating connection between said cylinders and said semaphore, depressible means disposed in said highway between said semaphore and said casing, in adjacency to said cover and in the path of vehicles moving from said semaphore toward said casing and means, actuated by passage of a vehicle moving away from said semaphore and over said depressible means, for supporting said cover against operative depression during the subsequent passage of said vehicle over said cover.

ROBERT L. COOPER.
VICTOR REED THOMPSON.